US009944279B2

(12) United States Patent
Hata et al.

(10) Patent No.: US 9,944,279 B2
(45) Date of Patent: Apr. 17, 2018

(54) CONTROL SYSTEM FOR HYBRID VEHICLE

(71) Applicant: TOYOTA JIDOSHA KABUSHIKI KAISHA, Toyota-shi, Aichi (JP)

(72) Inventors: Kensei Hata, Toyota (JP); Yuji Iwase, Toyota (JP); Yosuke Suzuki, Toyota (JP); Koichi Kato, Toyota (JP); Seitaro Nobuyasu, Toyota (JP); Taro Moteki, Toyota (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/304,974

(22) PCT Filed: Mar. 25, 2015

(86) PCT No.: PCT/JP2015/001703
§ 371 (c)(1),
(2) Date: Oct. 18, 2016

(87) PCT Pub. No.: WO2015/159490
PCT Pub. Date: Oct. 22, 2015

(65) Prior Publication Data
US 2017/0182997 A1 Jun. 29, 2017

(30) Foreign Application Priority Data

Apr. 18, 2014 (JP) .................................. 2014-086105

(51) Int. Cl.
*B60W 20/00* (2016.01)
*B60W 20/40* (2016.01)
(Continued)

(52) U.S. Cl.
CPC ............. *B60W 20/40* (2013.01); *B60K 6/383* (2013.01); *B60K 6/387* (2013.01); *B60K 6/40* (2013.01);
(Continued)

(58) Field of Classification Search
CPC ................. B60W 20/40; B60W 10/08; B60W 2710/027; B60W 2710/025; B60K 6/445;
(Continued)

(56) References Cited

U.S. PATENT DOCUMENTS 5,643,131 A * 7/1997 Kuhn .................... F16H 37/084
475/210
5,722,502 A * 3/1998 Kubo .................... B60K 6/442
180/65.23
(Continued)

FOREIGN PATENT DOCUMENTS

JP H08-295140 A 11/1996
JP 2015-033915 A 2/2015
(Continued)

*Primary Examiner* — Jacob B Meyer
(74) *Attorney, Agent, or Firm* — Oliff PLC

(57) ABSTRACT

A control system for a hybrid vehicle configured to promptly shift a drive mode. In the single-motor mode, the vehicle is powered by a second motor while bringing an engagement device into disengagement and stopping the engine. In the dual-motor mode, the vehicle is powered by both a first motor and the second motor while bringing the engagement device into engagement and stopping a rotation of the output shaft of the engine by a stopper device. When shifting the drive mode from the single-motor mode to the dual-motor mode, the control system controls the first motor in a manner such that a speed difference between an input speed and an output speed of the engagement device is reduced while increasing a torque transmitting capacity of the engagement device.

13 Claims, 6 Drawing Sheets

(51) Int. Cl.
*B60K 6/383* (2007.10)
*B60K 6/387* (2007.10)
*B60K 6/40* (2007.10)
*B60K 6/445* (2007.10)
*B60W 10/08* (2006.01)
*B60K 6/20* (2007.10)
*B60K 6/22* (2007.10)

(52) U.S. Cl.
CPC ............ *B60K 6/445* (2013.01); *B60W 10/08* (2013.01); *B60K 6/20* (2013.01); *B60K 6/22* (2013.01); *B60W 2710/025* (2013.01); *B60W 2710/027* (2013.01)

(58) Field of Classification Search
CPC .......... B60K 6/40; B60K 6/387; B60K 6/383; B60K 6/22; B60K 6/20
See application file for complete search history.

(56) References Cited

U.S. PATENT DOCUMENTS

| | | | | |
|---|---|---|---|---|
| 5,766,105 | A * | 6/1998 | Fellows | F16H 61/6625 474/17 |
| 5,788,006 | A * | 8/1998 | Yamaguchi | B60K 6/365 180/65.235 |
| 6,447,422 | B1 * | 9/2002 | Haka | F16H 37/0846 475/210 |
| 6,732,526 | B2 * | 5/2004 | Minagawa | B60K 6/445 180/65.235 |
| 6,887,175 | B2 * | 5/2005 | Yamauchi | B60K 6/365 475/10 |
| 7,172,524 | B2 * | 2/2007 | Moeller | B60W 20/15 180/65.6 |
| 7,252,611 | B2 * | 8/2007 | Raghavan | B60K 6/365 475/5 |
| 7,282,008 | B2 * | 10/2007 | Oshidari | B60K 6/445 477/3 |
| 7,338,401 | B2 * | 3/2008 | Klemen | B60W 20/11 475/149 |
| 7,347,800 | B2 * | 3/2008 | Jackson | F16H 37/0846 475/210 |
| 7,422,535 | B2 * | 9/2008 | Raghavan | B60K 6/365 475/280 |
| 7,473,199 | B2 * | 1/2009 | Bucknor | B60K 6/365 475/5 |
| 7,572,201 | B2 * | 8/2009 | Supina | B60K 6/40 180/65.22 |
| 7,637,836 | B2 * | 12/2009 | Watanabe | B60K 6/365 475/209 |
| 7,749,132 | B2 * | 7/2010 | Motosugi | B60K 6/48 477/176 |
| 8,337,352 | B2 * | 12/2012 | Morrow | B60K 6/365 475/302 |
| 8,550,958 | B2 * | 10/2013 | Sah | B60W 10/08 180/65.275 |
| 8,900,080 | B2 * | 12/2014 | Kawasaki | B60K 6/48 475/210 |
| 8,974,337 | B2 * | 3/2015 | Kawasaki | B60K 6/445 475/5 |
| 9,291,218 | B2 * | 3/2016 | Hata | F16D 48/06 |
| 9,410,620 | B2 * | 8/2016 | Tsuge | F16H 61/0437 |
| 9,470,309 | B2 * | 10/2016 | Masunaga | F16H 61/04 |
| 2004/0065520 | A1 * | 4/2004 | Murray | F16H 61/0021 192/48.7 |
| 2006/0276295 | A1 * | 12/2006 | Gitt | F16H 37/0846 475/210 |
| 2008/0236917 | A1 * | 10/2008 | Abe | B60K 6/365 180/65.235 |
| 2009/0157269 | A1 * | 6/2009 | Matsubara | B60K 6/365 701/54 |
| 2010/0063704 | A1 * | 3/2010 | Okubo | B60K 6/365 701/99 |
| 2010/0120579 | A1 * | 5/2010 | Kawasaki | B60K 6/365 477/3 |
| 2010/0227722 | A1 * | 9/2010 | Conlon | B60K 6/365 475/5 |
| 2010/0273605 | A1 * | 10/2010 | Kawasaki | B60K 6/48 477/20 |
| 2011/0028260 | A1 * | 2/2011 | Kawasaki | B60K 6/48 475/220 |
| 2011/0118075 | A1 * | 5/2011 | Kawasaki | B60K 6/48 475/331 |
| 2011/0118077 | A1 * | 5/2011 | Kawasaki | B60K 6/445 477/3 |
| 2012/0028749 | A1 * | 2/2012 | Kawasaki | B60K 6/48 475/211 |
| 2012/0309584 | A1 * | 12/2012 | Matsue | B60W 10/02 477/3 |
| 2013/0331216 | A1 * | 12/2013 | Tuckfield | B60K 6/383 475/5 |
| 2015/0183423 | A1 * | 7/2015 | Yamamoto | B60K 6/387 477/3 |
| 2016/0176396 | A1 * | 6/2016 | Hata | B60W 10/02 701/22 |
| 2017/0182997 | A1 * | 6/2017 | Hata | B60W 20/40 |

FOREIGN PATENT DOCUMENTS

JP        5950036 B2    7/2016
WO   2014/013555 A1   1/2014

* cited by examiner

[Fig. 1]
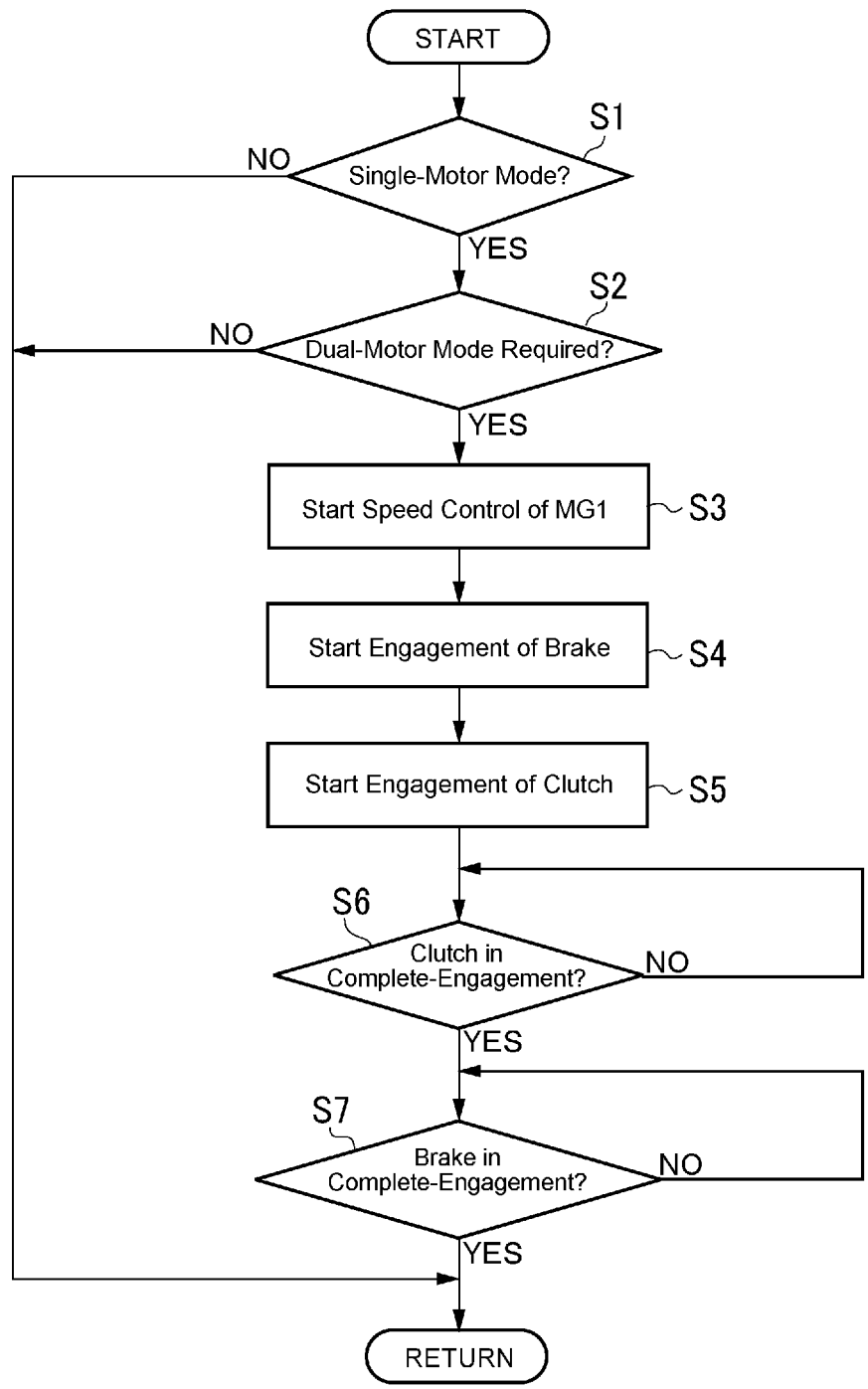

[Fig. 2]
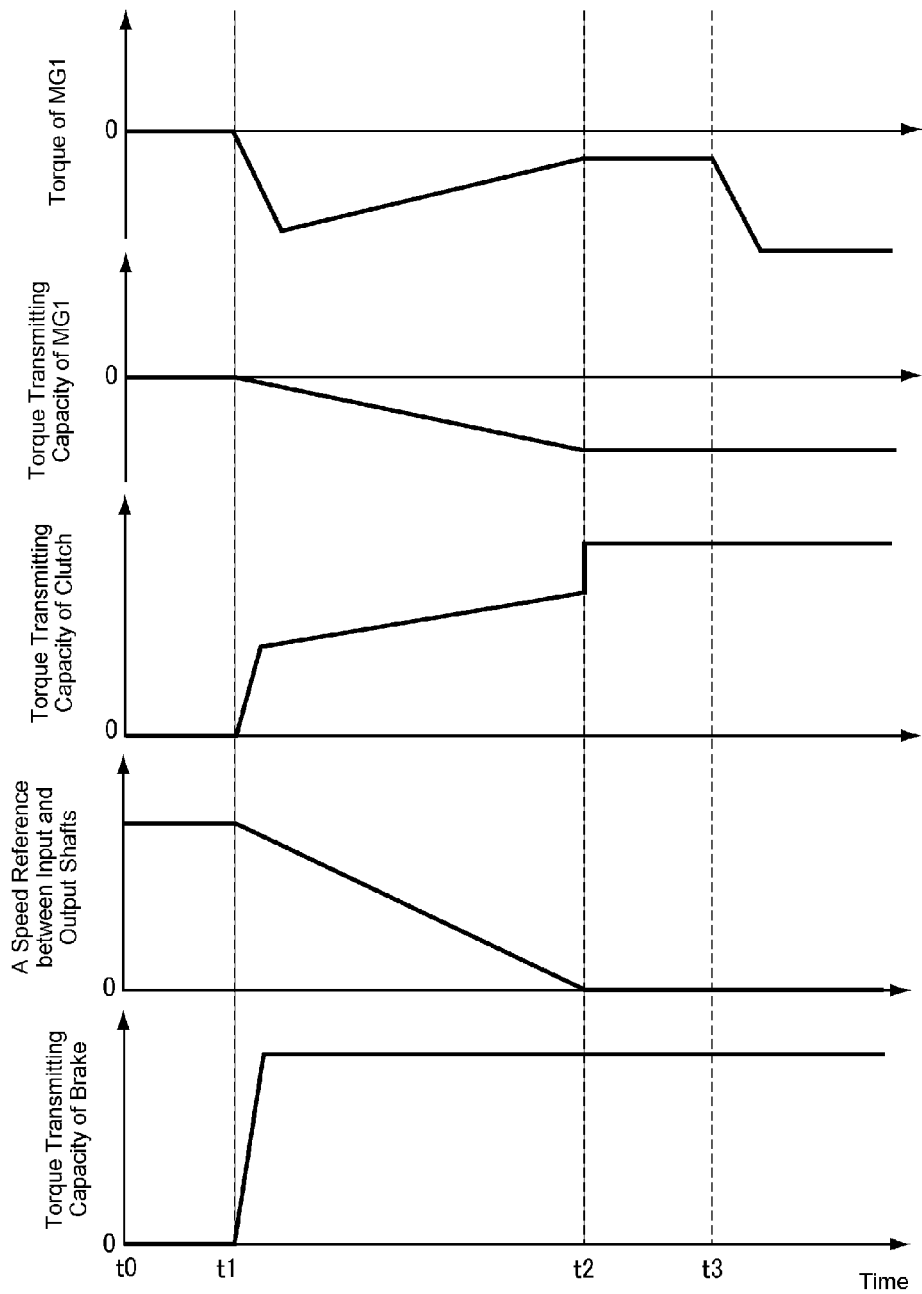

[Fig. 3]
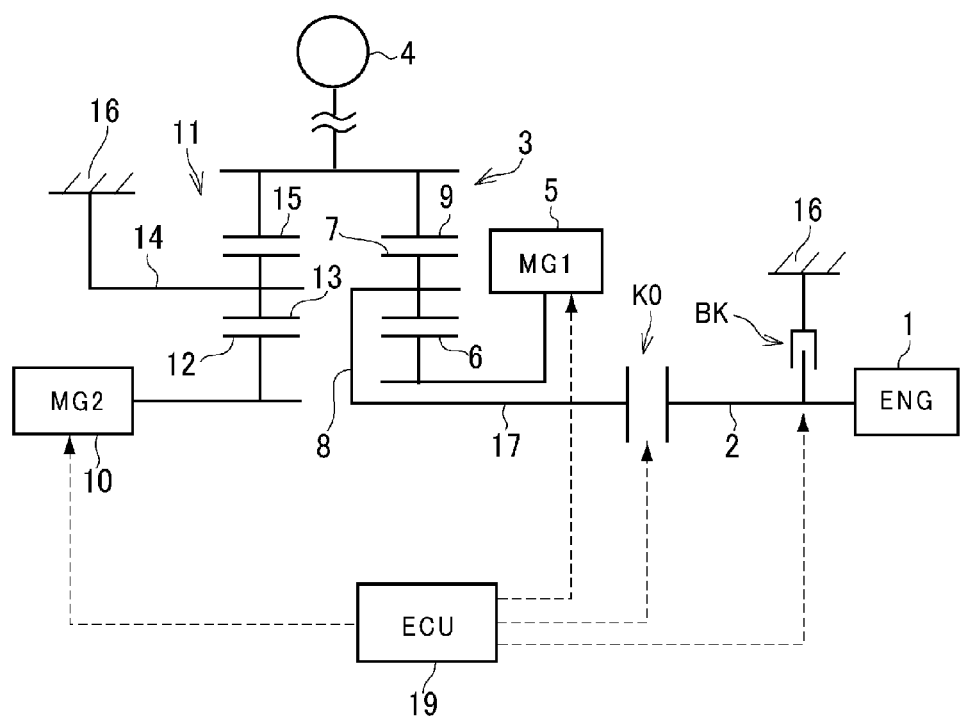

[Fig. 4]
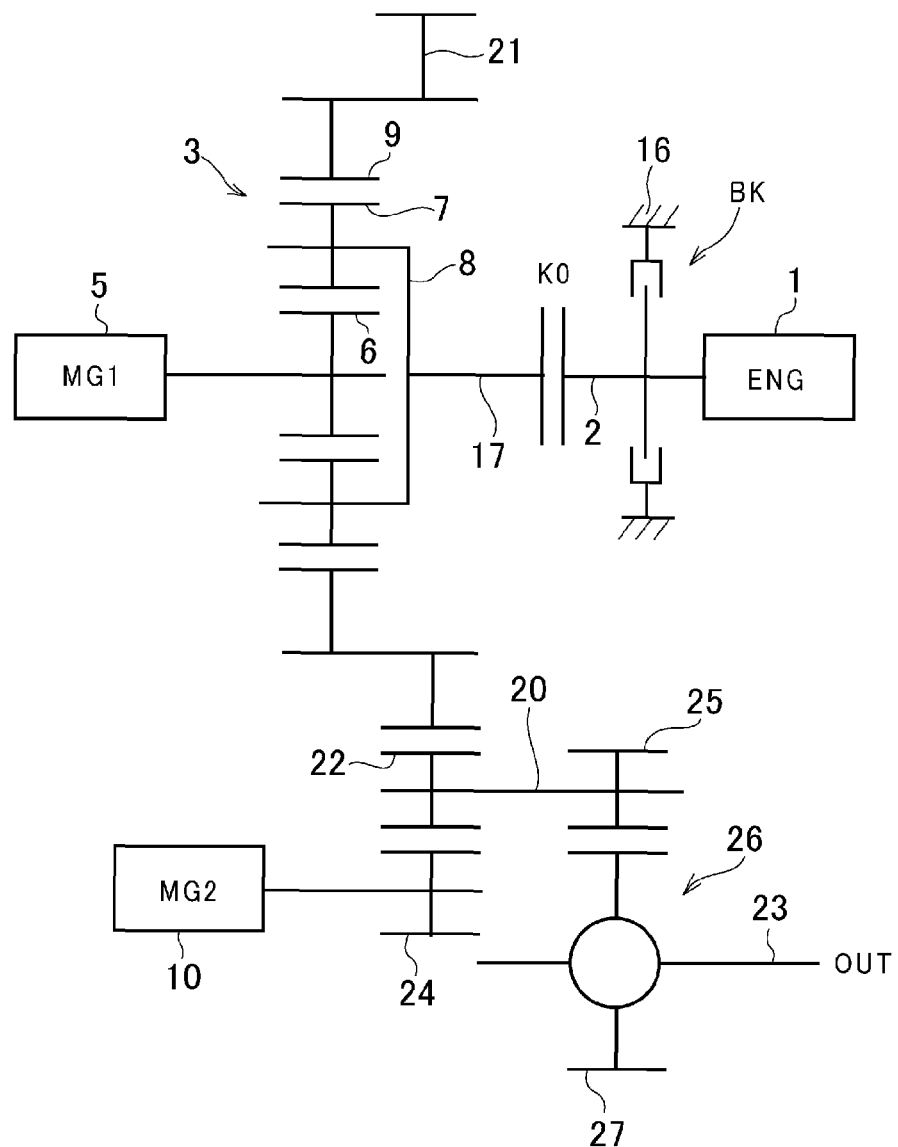

[Fig. 5]
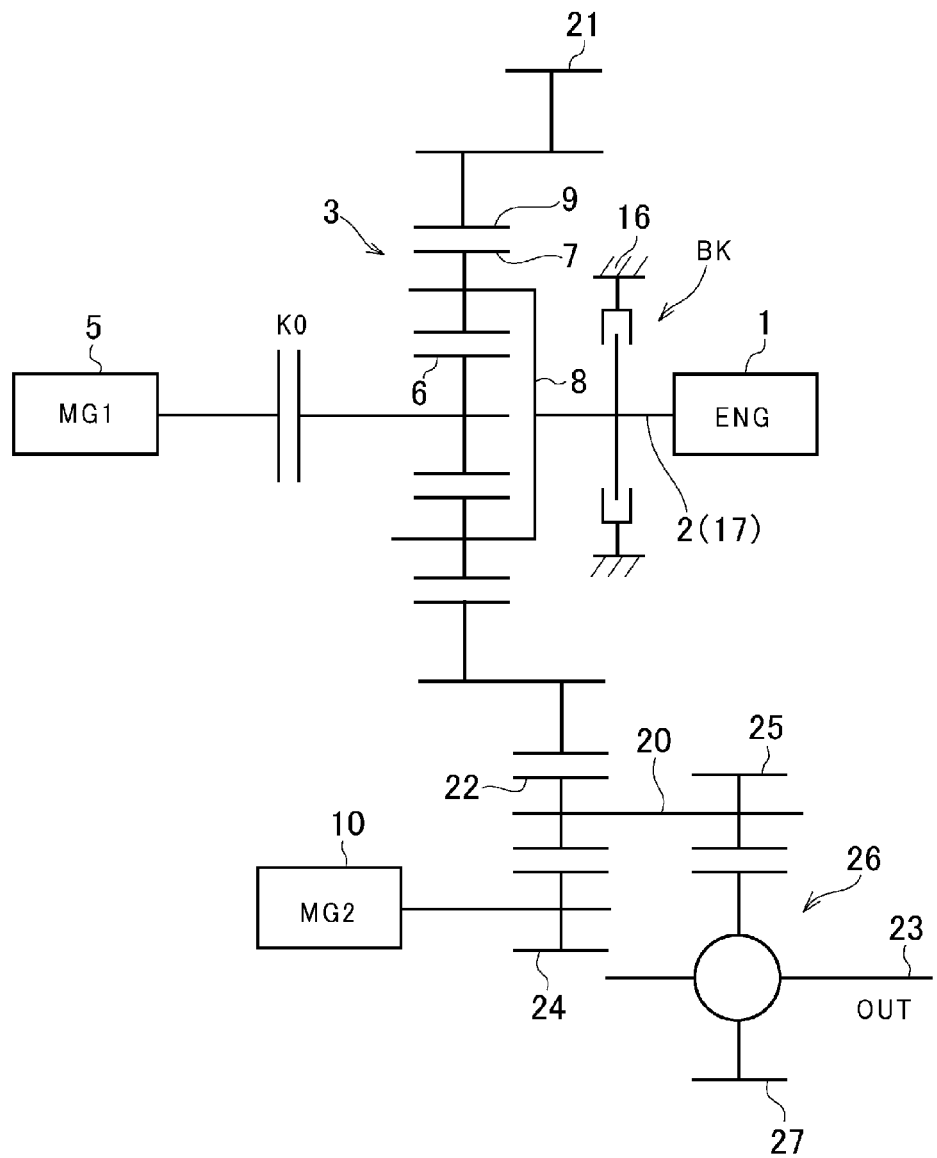

[Fig. 6]
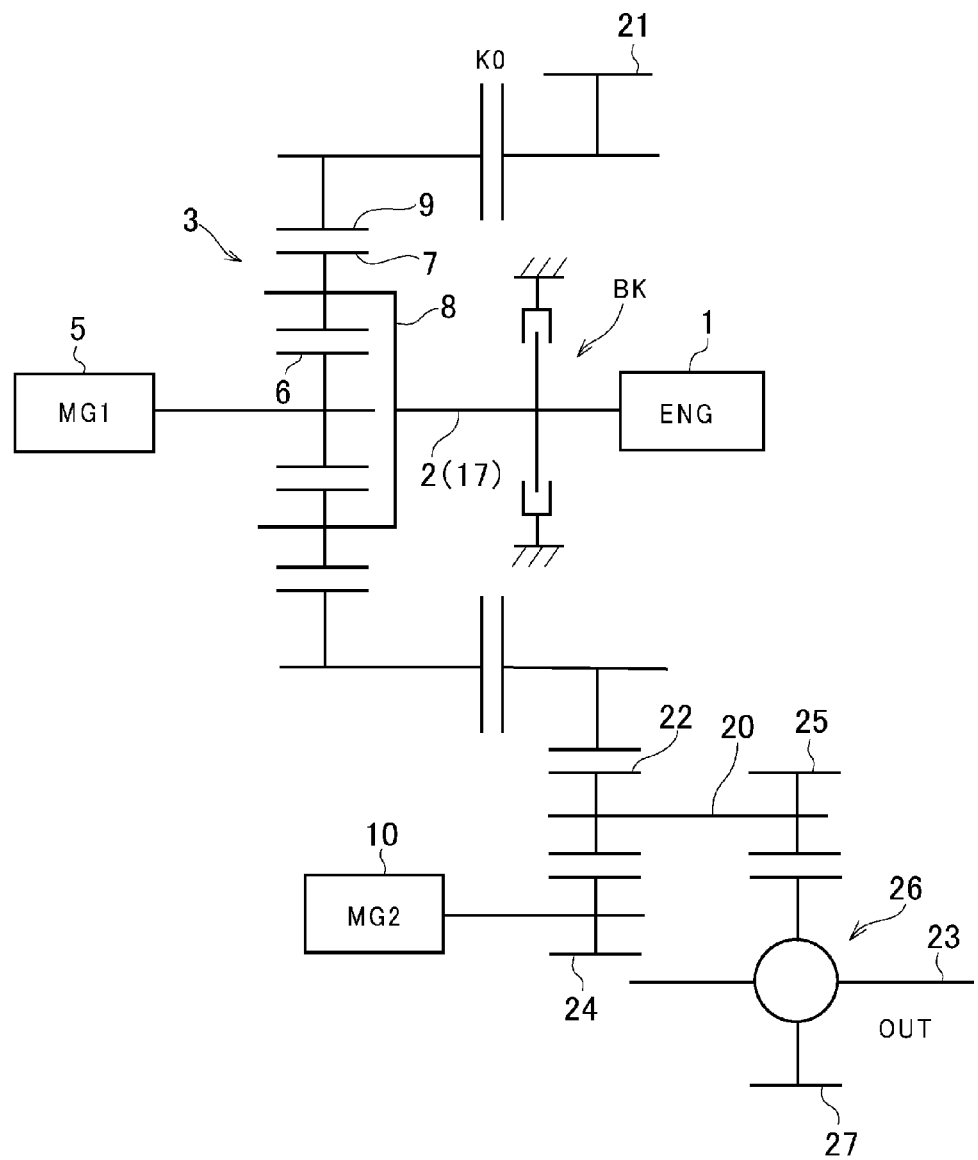

CONTROL SYSTEM FOR HYBRID VEHICLE

TECHNICAL FIELD

The present invention relates to a control system for a hybrid vehicle having an engine and a plurality of motors, that is configured to selectively power the vehicle by one of the motors and by least two motors.

BACKGROUND ART

JP-A-08-295140 describes a hybrid vehicle having a differential gear unit including a first rotary element connected to an engine, a second rotary element connected to the first motor, and a third rotary element connected to driving wheels, and a second motor connected to the driving wheels. In the hybrid vehicle taught by JP-A-08-295140, a drive mode can be selected from an engine drive mode in which the vehicle is powered by the engine by controlling the first motor in a manner such that the second rotary element serves as a reaction element, and a motor drive mode in which the vehicle is powered by the second motor. According to the teachings of JP-A-08-295140, a one-way clutch and a control brake are disposed on an input shaft of the differential gear unit to propel the vehicle by the first and the second motors while stopping the engine even if a required drive torque is relatively large. In this case, specifically, the first rotary element serves as a reaction element, and the second rotary element serves as an input element. In addition, in order to power the vehicle by both motors without stopping the engine, a clutch is disposed between the input shaft of the differential gear unit and an output shaft of the engine so as to disconnect the engine from the differential gear unit.

SUMMARY OF INVENTION

Technical Problem

As described, according to the teachings of JP-A-08-295140, the hybrid vehicle is provided with the clutch disposed between an output shaft of the engine and an input shaft of a differential gear unit, and a stopper device such as a one-way clutch for halting the input shaft of the differential gear unit. In the vehicle thus structured, the stopper device may be damaged by a torque applied thereto from the driving wheels to the stopper device if such torque is excessively large. In order to reduce the torque applied to the stopper device, a torque limiter may be disposed between the input shaft of the differential gear unit and the first rotary element. In this case, however, a space for arranging the torque limiter is additionally required and this will result in a growth in size of the vehicle.

Instead, the clutch for disconnecting the engine from the differential gear unit may also be disposed between the input shaft of the differential gear unit and the first rotary element to serve as a torque limiter of the stopper device. In this case, a clutch is brought into engagement to shift a drive mode from a single-motor mode to a dual-motor mode. To this end, however, a synchronization of an input speed and an output speed has to be carried out to reduce a speed difference therebetween to almost zero during engagement of the clutch, and then generate a torque by the first motor after completion of engagement of the clutch. Thus, it may take long time to complete the shifting operation of the drive mode and hence acceleration response of the hybrid may be deteriorated.

The present invention has been conceived noting the foregoing technical problems, and it is therefore an object of the present invention is to provide a control system for a hybrid vehicle configured to shift a drive mode promptly from a single-motor mode where the vehicle is powered by at least one of the motors, to a dual-motor mode where the vehicle is powered by at least two motors.

Solution to Problem

The control system according to the present invention is applied to a hybrid vehicle comprising: an engine and a plurality of motors; a differential mechanism having a first rotary element connected to the engine, a second rotary element connected to a first motor, and a third rotary element connected to a second motor and to driving wheels; an engagement device adapted to interrupt a torque transmission to one of the rotary elements while changing a torque transmitting capacity thereof; and a stopper device that is arranged closer to the engine than the engagement device while being fixed to a fixed member, and that is adapted to stop a rotation of an output shaft of the engine when it is in engagement. In order to achieve the above-mentioned objectives, according to the present invention, the control system is configured to control the first motor in a manner such that a speed difference between an input speed and an output speed of the engagement device is reduced while increasing a torque transmitting capacity of the engagement device, when shifting a drive mode from a first mode in which the vehicle is powered by the second motor while bringing the engagement device into disengagement and stopping the engine to a second mode in which the vehicle is powered by both the first motor and the second motor while bringing the engagement device into engagement and stopping a rotation of the output shaft of the engine by the stopper device.

Specifically, the stopper device is adapted to control a braking force applied to the output shaft. In addition, the control system may be configured to increase the braking force applied to the output shaft by the stopper device before increasing the torque transmitting capacity of the engagement device, when shifting the drive mode from the first mode to the second mode.

The control system may be configured to reduce the torque transmitting capacity of the engagement device to be smaller than a torque required to rotate the engine.

The control system may be configured to increase a torque transmitting capacity of engagement device while reducing the torque of the second motor with a reduction in the speed difference between the input speed and the output speed of the engagement device.

Advantageous Effects of Invention

Thus, the control system of the present invention is applied to the hybrid vehicle comprising: the differential mechanism connected to the engine and the motors; the engagement device adapted to selectively interrupt the torque transmission to one of the rotary elements; and the stopper device that is arranged closer to the engine than the engagement device to stop the output shaft of the engine. As described, the control system is configured to control the first motor in a manner such that the speed difference between the input speed and the output speed of the engagement device is reduced while increasing the torque transmitting capacity of the engagement device, when shifting the drive mode from the first mode in which the vehicle is powered by the second motor while bringing the engagement device into disengagement and stopping the engine to the second mode in which the vehicle is powered by both the first motor and the second motor while bringing the engagement device into engagement and stopping the rotation of the output shaft of the engine by the stopper device. According to the present invention, therefore, the engagement device can be brought into engagement without waiting for synchronization of an input speed and an output speed thereof so that the drive mode can be promptly shifted from the first mode to the second mode. For this reason, acceleration response of the vehicle can be enhanced.

As also described, the stopper device can be adapted to control the braking force applied to the output shaft. Therefore, the engine can be prevented from being rotated when the engagement device starts transmitting the torque, by increasing the braking force applied to the output shaft by the stopper device before bringing the engagement device into engagement, when shifting the drive mode from the first mode to the second mode.

The engine can be prevented from being rotated more certainly when the engagement device starts transmitting the torque by reducing the torque transmitting capacity of the engagement device to be smaller than a torque required to rotate the engine. In this case, a power loss caused by rotating the engine can be reduced so that electric consumption can be reduced during shifting the drive mode.

In addition, engagement shocks of the engagement device can be reduced by increasing the torque transmitting capacity thereof while reducing the torque of the second motor with a reduction in the speed difference between the input speed and the output speed of the engagement device.

BRIEF DESCRIPTION OF DRAWINGS

FIG. 1 is a flowchart showing a control example according to the present invention.

FIG. 2 is a time chart showing temporal changes in a status of the first motor-generator, torque transmitting capacities of a clutch and a brake, a difference between rotational speeds of input and output shafts of the clutch during execution of the control shown in FIG. 1.

FIG. 3 is a skeleton diagram schematically showing a first example of the vehicle to which the control system of the invention is applied.

FIG. 4 is a skeleton diagram schematically showing a second example of the vehicle to which the control system of the invention is applied.

FIG. 5 is a skeleton diagram schematically showing a third example of the vehicle to which the control system of the invention is applied.

FIG. 6 is a skeleton diagram schematically showing a fourth example of the vehicle to which the control system of the invention is applied.

DESCRIPTION OF EMBODIMENTS

The vehicle control system of the preferred example is applied to a vehicle having an engine and a plurality of motors respectively serving as a prime mover. A first example of the vehicle to which the control system is applied is illustrated in FIG. 3. In the vehicle shown in FIG. 3, an output shaft 2 of an engine 1 (represented by "ENG" in FIG. 3) is connected to a power distribution device 3 through a clutch K0. As the conventional power distribution device used in a two-motor type hybrid drive unit, the power distribution device 3 serves as a differential mechanism to distribute power of the engine 1 to a motor and to driving wheels 4. To this end, according to the preferred examples, a single-pinion planetary gear unit is used as the power distribution device 3. Specifically, the power distribution device 3 is comprised of: a sun gear 6 connected to a first motor 5 (represented by "MG1" in FIG. 3), a plurality of pinion gear 7 meshing with the sun gear 6; a carrier 8 connected to the engine 1 while holding the pinion gears 7 in a manner to rotate and revolve around the sun gear 6; and a ring gear 9 arranged concentrically with the sun gear 6 while meshing with the pinion gears 7. The ring gear 9 is connected to the driving wheels 4 through a not shown gear train (i.e. differential gear) to transmit torque.

In the power distribution device 3, the sun gear 6 is allowed to serve as a reaction element by generating a torque by the first motor 5 to counteract against a torque of the engine 1 applied to the sun gear 6 so that the torque of the engine 1 can be delivered to the driving wheels 4. In the preferred examples, a synchronous motor having a generating function i.e., a motor-generator is used as the first motor 5, and electric power is generated by rotating the first motor 5 in a direction opposite to generate a drive torque. That is, while the first motor 5 generates torque applied to the sun gear 6 to counteract to the torque of the engine 1, the power of the engine 1 is partially converted into electric power by rotating first motor 5 in the direction opposite to the torque of the first motor 5. Consequently, the power of the engine 1 is delivered to the driving wheels 4 while being reduced in a generation amount of the first motor 5.

In the example shown in FIG. 3, a second motor 10 (represented by "MG2" in FIG. 3) is disposed on an extension of an output shaft 2 of the engine 1. The second motor 10 is connected to the ring gear 9 through a reduction device 11 as a single-pinion type planetary gear unit. Specifically, the reduction device 11 is also a differential mechanism comprising: a sun gear 12; a carrier 14 supporting a plurality of pinion gears 13 meshing with the sun gear 12 in a rotatable manner; and a ring gear 15 arranged concentrically with the sun gear 12. The sun gear 12 is connected to the second motor 10, the ring gear 15 is connected to the power distribution device 3 to be rotated integrally therewith, and the carrier 14 is connected to a fixed member 16 such as a housing. Accordingly, torque of the second motor 10 is transmitted to the ring gear 15 in accordance with a speed ratio of the planetary gear unit while being reversed.

The second motor 10 is also a synchronous motor having a generating function i.e., a motor-generator. The second motor 10 is adapted to change the torque transmitted from the engine 1 to the driving wheels 4. Specifically, when the first motor 5 is rotated in the opposite direction, the generated electric power and electric power of a not shown battery is supplied to drive the second motor 10. To the contrary, when the first motor 5 rotates to generate torque, the torque of the first motor 5 is added to a drive torque to propel the vehicle, and surplus power is again converted into an electric power by the second motor 10. Here, during decelerating the vehicle, a braking force can be applied to the driving wheels 4 by operating the second motor 10 serves as a generator.

The vehicle according to the preferred example can be powered not only by the engine 1 but also by second motor 10 while stopping the engine 1. Hereinafter, a drive mode for propelling the vehicle by the torque of the second motor 10 will be called the "single-motor mode". In the single-motor mode, the torque of the second motor 10 is transmitted to the driving wheels 4 as well as to the power distribution device 3 through the ring gear 15. Here, inertial torque of the engine 1 is larger than that of the first motor 5, therefore, when the torque of the second motor 10 is applied to the power distribution device 3, the engine 1 will not be rotated but the first motor 5 is idled. That is, when torque of the second motor 10 is transmitted to the power distribution device 3, the engine 1 establishes a reaction force and the first motor 5 is allowed to rotate. In this situation, such idling of the first motor will result in a power loss. In order to avoid such power loss caused by the inertial torque of the engine 1 and idling of the first motor 5, according to the first example shown in FIG. 3, a clutch K0 is provided to interrupt torque transmission between an input shaft 17 integrated with the carrier 8 and the output shaft 2 of the engine 1. Accordingly, the clutch K0 serves as the claimed engagement device.

For example, any of a conventional dry-type friction clutch and a wet-type friction clutch may be used as the clutch K0. Specifically, the dry-type friction clutch is adapted to elastically bring friction plates into engagement by a diaphragm spring, and bring the friction plates into disengagement by pushing the diaphragm spring by an actuator in a direction to isolate those friction plates away from each other. In turn, the wet-type friction clutch is adapted to be brought into engagement in accordance with an actuation of a hydraulic actuator or an electromagnetic actuator. In addition, other kinds of clutches a torque capacity thereof can be varied gradually may also be used as the clutch K0 instead of the friction clutch.

In the single-motor mode, the vehicle is powered only by the second motor 10 and hence a large driving force cannot be generated. When a driving force larger than a maximum torque of the second motor 10 is required to propel the vehicle shown in FIG. 3, a torque of the first motor 5 may be added to the torque of the second motor 10. In the following description, a drive mode for propelling the vehicle by torques of both the first and the second motors 5 and 10 will be called the "dual-motor mode". According to the preferred examples, a brake BK is disposed on the output shaft 2 of the engine 1 to stop the rotation thereof. Specifically, the brake BK is fixed to a fixed member 16 so that a braking force is applied to the output shaft 2 when it is in engagement. In the first example shown in FIG. 3, although a frictional engagement device adapted to frictionally stop the rotation of the output shaft 2 is used as the brake BK, other kinds of brake devices such as a one way clutch or a dog clutch may be also used as the fixing mechanism. Accordingly, the brake BK serves as the claimed stopper device.

As described, the carrier 8 is allowed to serve as a reaction element to deliver the torque of the first motor 5 to the driving wheels 4 by bringing the brake BK into engagement to stop the rotation of the output shaft 2 of the engine 1 while bringing the clutch K0 into engagement. Consequently, the vehicle is allowed to be propelled by a total torque of the first and the second motors 5 and 10 under the dual-motor mode.

By contrast, when the brake BK is in engagement, the clutch K0 may be slipped by an input torque from the driving wheels 4 to serve as a torque limiter of the brake BK. Therefore, the brake BK can be prevented from being damaged by an excessive torque, and it is unnecessary to use a large engagement device having high rigidity as the brake BK.

The vehicle shown in FIG. 3 is provided with an electronic control unit 19 to control the engine 1, motor generators 5 and 10, the clutch K0, and the brake BK. The ECU 19 is comprised of a microcomputer configured to carry out a calculation based on pre-installed data and data or command signal to be inputted thereto, and to transmit a calculation result to the engine 1, the motors 5 and 10, the clutch K0, the brake BK and so on in the form of command signal.

The control system according to the preferred example is configured to shift the drive mode promptly from the single-motor mode to the dual-motor mode when the required drive torque is increased. Referring now to FIG. 1, there is shown a control example of shifting the drive mode promptly, and the routine shown therein is repeated at predetermined intervals. At step S1, it is determined whether or not the current drive mode is the single-motor mode. For example, the determination of the step S1 may be made based on an existence of a command signal for bringing the clutch K0 into disengagement. Alternatively, the determination of the step S1 may also be made based on a drive demand represented e.g., by a depression of an acceleration pedal (not shown).

If the vehicle is not propelled in the single-motor mode but propelled in the dual-motor mode or powered by the engine 1 so that the answer of the step S1 is NO, the routine is returned. To the contrary, if the vehicle is propelled in the single-motor mode so that the answer of the step S1 is YES, it is determined at step S2 whether or not the drive mode is required to be shifted to the dual-motor mode. At the step S2, specifically, it is determined whether or not the required drive force is larger than the maximum drive force of the single-motor mode which can be generated only by the second motor 10.

If the drive mode is not required to be shifted to the dual-motor mode so the answer of the step S2 is NO, the routine is returned. By contrast, the drive mode is required to be shifted to the dual-motor mode so that the answer of the step S2 is YES, engagement controls of the clutch K0 and the brake BK are commenced. As described, the engine 1 is stopped and the clutch K0 is in disengagement in the single-motor mode, and hence both the output shaft 2 and the first motor 5 are not rotated in this situation. Therefore, a control of a speed of the first motor 5 is executed at step S3 to start rotating the first motor 5 in a backward direction against the rotational direction of the engine 1 so as to reduce a speed difference between the output shaft 2 and the input shaft 17. Then, an engagement of the brake BK is commenced at step S4, and a torque transmitting capacity of the clutch K0 is increased at step S5.

Here, an order of steps from S3 to S5 is not limited to the above-explained order and those steps may be carried out simultaneously. According to the preferred example, the clutch K0 is brought into engagement gradually while rotating the first motor 5 backwardly, and in this situation the engine 1 can be prevented from being rotated by bringing the brake BK into engagement prior to bring the clutch K0 into engagement. For these reasons, it is preferable to carry out step S4 to start the engagement of the brake BK and then carry out step S5 to start the engagement of the clutch K0. In addition, an inertial torque of the first motor 5 may be reduced when starting the engagement of the clutch K0 by starting to rotate the first motor 5 prior to starting the engagement of the clutch K0. That is, the engine 1 can be prevented from being rotated by the torque of the first motor 5 when starting the engagement of the clutch K0. Therefore, it is preferable to carry out step S3 to rotate the first motor 5 prior to starting the engagement of the clutch K0 also in this point of view. According to the preferred example, therefore, steps S3 to S5 are carried out in the order shown in FIG. 1.

Then, at the step S6, it is determined whether or not the clutch K0 is in complete-engagement. For example, such determination of step S6 can be made based on a fact that a rotational speed of the input shaft 17 is synchronized with that of the output shaft 2. Instead, the determination of step S6 may also be made based on a command signal to the actuator for actuating the clutch K0. If the clutch K0 is not in complete-engagement so that the answer of the step S6 is NO, the step S6 is repeated until the clutch K0 is brought into complete-engagement. By contrast, if the clutch K0 is in complete-engagement so that the answer of the step S6 is YES, it is determined at step S7 whether or not the brake BK is in complete-engagement. For instance, such determination of step S7 can be made based on a command signal to the actuator for actuating the brake BK. Instead, the determination of step S7 may also be made by confirming whether or not the output shaft 2 is rotated by applying a small torque thereto from the first motor 5.

Here will be explained temporal changes in a status of the first motor-generator, torque transmitting capacities of the clutch K0 and the brake BK, a speed difference between the input shaft 17 and the output shaft 2 during execution of the control shown in FIG. 1 with reference to a time chart shown in FIG. 2. In the example shown in FIG. 2, the vehicle is propelled under the single-motor mode at point t0 and the first motor 5 is stopped without generating torque. In this situation, both the clutch K0 and the brake BK are in disengagement without transmitting torque, and the speed difference between the output shaft 2 and the input shaft 17 is relatively large.

Then, the determination of step S2 to shift the drive mode to the dual-motor mode is made at point t1, the first motor 5 starts to be rotated and the engagements of the clutch K0 and the brake BK are commenced. In this situation, the torque transmitting capacity of the clutch K0 is reduced to be smaller than a sum of a friction torque and an inertial torque of the engine 1 and a braking torque of the brake BK in order not to rotate the engine 1 when bringing the clutch K0 into engagement. In the example shown in FIG. 2, the engagements of the clutch K0 and the brake BK are commenced at the point t1 simultaneously with starting to rotate the first motor 5 in the backward direction.

As can be seen from FIG. 2, a large output torque of the first motor 5 is required to start rotating backwardly at point t1. Then, in order to reduce the engagement shock of the clutch K0, the output torque of the first motor 5 is gradually reduced while increasing the torque transmitting capacity of the clutch K0 with a reduction in the speed difference between the output shaft 2 and the input shaft 17.

Then, when the rotational speed of the input shaft 17 is synchronized with that of the output shaft 2 at point t2, the torque transmitting capacity of the clutch K0 is increased to a maximum value so that the clutch K0 starts transmitting torque without slipping. In this situation, the output torque of the first motor 5 is kept at a predetermined level. Then, a completion of the engagement of the brake BK is determined at point t3 after a lapse of predetermined period. For example, the completion of the engagement of the brake BK may be determined during a period from t2 to t3 by confirming a fact that the output shaft 2 is not rotated even if the torque of the first motor 5 is increased while reducing the torque of the second motor 10. After the completion of engagement of the brake BK, the drive mode is shifted to the dual-motor mode so that the required driving force can be achieved by increasing the output torque of the first motor 5.

Thus, according to the preferred example shown in FIGS. 1 and 2, an engagement of the clutch K0 can be started while reducing the speed difference between the output shaft 2 and the input shaft 17. That is, the clutch K0 can be brought into engagement without waiting for the synchronization of the input speed and the output speed. For this reason, the driving force can be increased promptly according to need. In addition, the torque transmitting capacity of the clutch K0 is reduced to be smaller than the sum of the friction torque and the inertial torque of the engine 1 and the braking torque of the brake BK so that the engine 1 can be prevented from being rotated when bringing the clutch K0 into engagement. For this reason, a power loss caused by rotating the engine 1 can be reduced so that electric consumption can be reduced during shifting from the single-motor mode to the dual-motor mode. Further, since the brake BK is brought into engagement prior to increasing the torque transmitting capacity of the clutch K0, the engine 1 can be prevented certainly from being rotated. Therefore, the torque transmitting capacity of the clutch K0 can be increased promptly to shift the drive mode from the single-motor mode to the dual-motor mode.

In addition, since the rotation of engine 1 is thus prevented, a stopping position of the engine 1, that is, a crank angle of the stopping engine 1 will not be changed during the shifting operation of the drive mode. For this reason, the engine 1 can be cranked without causing shocks and noises resulting from a torque change. Further, the engagement shocks of the clutch K0 can be reduced by thus gradually increasing the torque transmitting capacity thereof while reducing the speed difference between the output shaft 2 and the input shaft 17.

The control system of the preferred example may be applied not only to the example shown in FIG. 3 but also to examples shown in FIGS. 4 to 6. Here, common reference numerals are allotted to the elements in common with those in the examples shown in FIGS. 4 to 6, and detailed explanation for those common elements will be omitted.

In the second example shown in FIG. 4, the first motor 5 is disposed on an extension of the input shaft 17. A counter shaft 20 is arranged parallel to a common rotational axis of the power distribution device 3 and the first motor 5, and a counter driven gear 22 is fitted onto the counter shaft 20 to be rotated integrally therewith while being meshed with an output gear 21 formed on the ring gear 9.

According to the second example, torque of the second motor 10 is added to the torque transmitted from the power distribution device 3 to a drive shaft 23. To this end, the second motor 10 is arranged parallel to the counter shaft 20, and a reduction gear 24 connected the rotor of the second motor 10 is engaged with the counter driven gear 22. The reduction gear 24 is diametrically smaller than the counter driven gear 22 so that the torque of the second motor 3 can be transmitted thereto while being amplified.

A counter drive gear 25 is also fitted onto the other side of the counter shaft 20 to be rotated integrally therewith while meshing with a ring gear 27 of a deferential gear 26 unit serving as a final reduction gear.

In order to interrupt the torque transmission between the engine 1 and the driving wheels 4, the clutch K0 may also be disposed between the first motor 5 and the sun gear 6 as shown in FIG. 5, or between the ring gear 9 and the output gear 21 as shown in FIG. 6. According to the third example and the fourth example shown in FIGS. 5 and 6 in which the clutch K0 is not disposed between the engine 1 and the distribution device 3, the output shaft 2 may be formed integrally with the input shaft 17.

The control system of the preferred example may also be applied to a vehicle in which the engine 1 is connected to the carrier 8 and the first motor 5 is connected to the sun gear 6. In the vehicle thus structured, the torque of the first motor 5 applied to the ring gear 9 will act in a direction opposite to that in the vehicle shown in FIG. 3 during shifting from the single-motor mode to the dual-motor mode. In this case, therefore, the first motor 5 will be rotated in the direction opposite to that indicated in FIG. 2. Optionally, an additional motor may be arranged between the power distribution device 3 and the driving wheels 4.

The invention claimed is:

1. A control system for a hybrid vehicle, the hybrid vehicle having:
(i) a prime mover including an engine and a plurality of motors,
(ii) a differential mechanism having a first rotary element connected to the engine, a second rotary element connected to a first motor of the plurality of motors and a third rotary element connected to a second motor of the plurality of motors, the third rotary element also connected to driving wheels of the vehicle,
(iii) an engagement device adapted to interrupt a torque transmission to one of the first, second and third rotary elements while changing a torque transmitting capacity of the engagement device, and
(iv) a stopper device that is arranged closer to the engine than the engagement device, the stopper device being fixed to a fixed member, the stopper device being adapted to stop a rotation of an output shaft of the engine when the stopper device is in engagement, wherein:
the control system is configured to change a rotational speed of the first motor so that a speed difference between an input speed and an output speed of the engagement device is reduced while simultaneously increasing a torque transmitting capacity of the engagement device, when shifting a drive mode from a first mode in which the vehicle is powered by the second motor while bringing the engagement device into disengagement and stopping the engine, to a second mode in which the vehicle is powered by both the first motor and the second motor while bringing the engagement device into engagement and stopping a rotation of the output shaft of the engine by the stopper device.

2. The control system as claimed in claim 1, wherein the stopper device is adapted to control a braking force applied to the output shaft, and
the control system is further configured to increase the braking force applied to the output shaft by the stopper device before increasing the torque transmitting capacity of the engagement device, when shifting the drive mode from the first mode to the second mode.

3. The control system as claimed in claim 1, wherein the control system is further configured to reduce the torque transmitting capacity of the engagement device to be smaller than a torque required to rotate the engine.

4. The control system as claimed in claim 1, wherein the control system is further configured to increase the torque transmitting capacity of the engagement device while reducing the torque of the first motor with a reduction in the speed difference between the input speed and the output speed of the engagement device.

5. A control system for a hybrid vehicle, the hybrid vehicle having: (i) a prime mover including an engine and at least two motors including a first motor and a second motor, (ii) a differential mechanism having a first rotary element connected to the engine, a second rotary element connected to the first motor and a third rotary element connected to the second motor and to driving wheels of the vehicle, (iii) a clutch adapted to interrupt a torque transmission to one of the first, second and third rotary elements while changing a torque transmitting capacity of the clutch, and (iv) a brake that is arranged closer to the engine than the clutch, the brake being fixed to a fixed member, the brake being adapted to stop a rotation of an output shaft of the engine when the brake is in engagement, the control system comprising:
an electronic control unit configured to (a) change a rotational speed of the first motor so that a speed difference between an input speed and an output speed of the clutch is reduced (b) while simultaneously increasing a torque transmitting capacity of the clutch, when shifting a drive mode from a first mode to a second mode, wherein (1) in the first mode the vehicle is powered by the second motor while the clutch is brought into disengagement and the engine is stopped, and (2) in the second mode the vehicle is powered by both the first motor and the second motor while the clutch is brought into engagement and a rotation of the output shaft of the engine is stopped by the brake.

6. The control system as claimed in claim 5, wherein the brake is adapted to control a braking force applied to the output shaft, and
the electronic control unit is further configured to increase the braking force applied to the output shaft by the brake before increasing the torque transmitting capacity of the clutch, when shifting the drive mode from the first mode to the second mode.

7. The control system as claimed in claim 5, wherein the electronic control unit is further configured to reduce the torque transmitting capacity of the clutch to be smaller than a torque required to rotate the engine.

8. The control system as claimed in claim 5, wherein the electronic control unit is further configured to increase the torque transmitting capacity of the clutch while reducing the torque of the first motor with a reduction in the speed difference between the input speed and the output speed of the clutch.

9. A hybrid vehicle comprising:
a prime mover including an engine and at least two motors including a first motor and a second motor;
a differential mechanism having a first rotary element connected to the engine, a second rotary element connected to the first motor and a third rotary element connected to the second motor and to driving wheels of the vehicle;
a clutch adapted to interrupt a torque transmission to one of the first, second and third rotary elements while changing a torque transmitting capacity of the clutch;
a brake that is arranged closer to the engine than the clutch, the brake being fixed to a fixed member, the brake being adapted to stop a rotation of an output shaft of the engine when the brake is in engagement; and
an electronic control unit configured to (a) change a rotational speed of the first motor so that a speed difference between an input speed and an output speed of the clutch is reduced (b) while simultaneously increasing a torque transmitting capacity of the clutch, when shifting a drive mode from a first mode to a second mode, wherein
in the first mode the vehicle is powered by the second motor while the clutch is brought into disengagement and the engine is stopped, and
in the second mode the vehicle is powered by both the first motor and the second motor while the clutch is brought into engagement and a rotation of the output shaft of the engine is stopped by the brake.

10. The hybrid vehicle as claimed in claim 9, wherein the brake is adapted to control a braking force applied to the output shaft, and the electronic control unit is further configured to increase the braking force applied to the output shaft by the brake before increasing the torque transmitting capacity of the clutch, when shifting the drive mode from the first mode to the second mode.

11. The hybrid vehicle as claimed in claim 9, wherein the electronic control unit is further configured to reduce the torque transmitting capacity of the clutch to be smaller than a torque required to rotate the engine.

12. The hybrid vehicle as claimed in claim 9, wherein the electronic control unit is further configured to increase the torque transmitting capacity of the clutch while reducing the torque of the first motor with a reduction in the speed difference between the input speed and the output speed of the clutch.

13. The hybrid vehicle as claimed in claim 9, wherein the differential mechanism includes a planetary gear unit.

\* \* \* \* \*